United States Patent Office 2,808,910
Patented Oct. 8, 1957

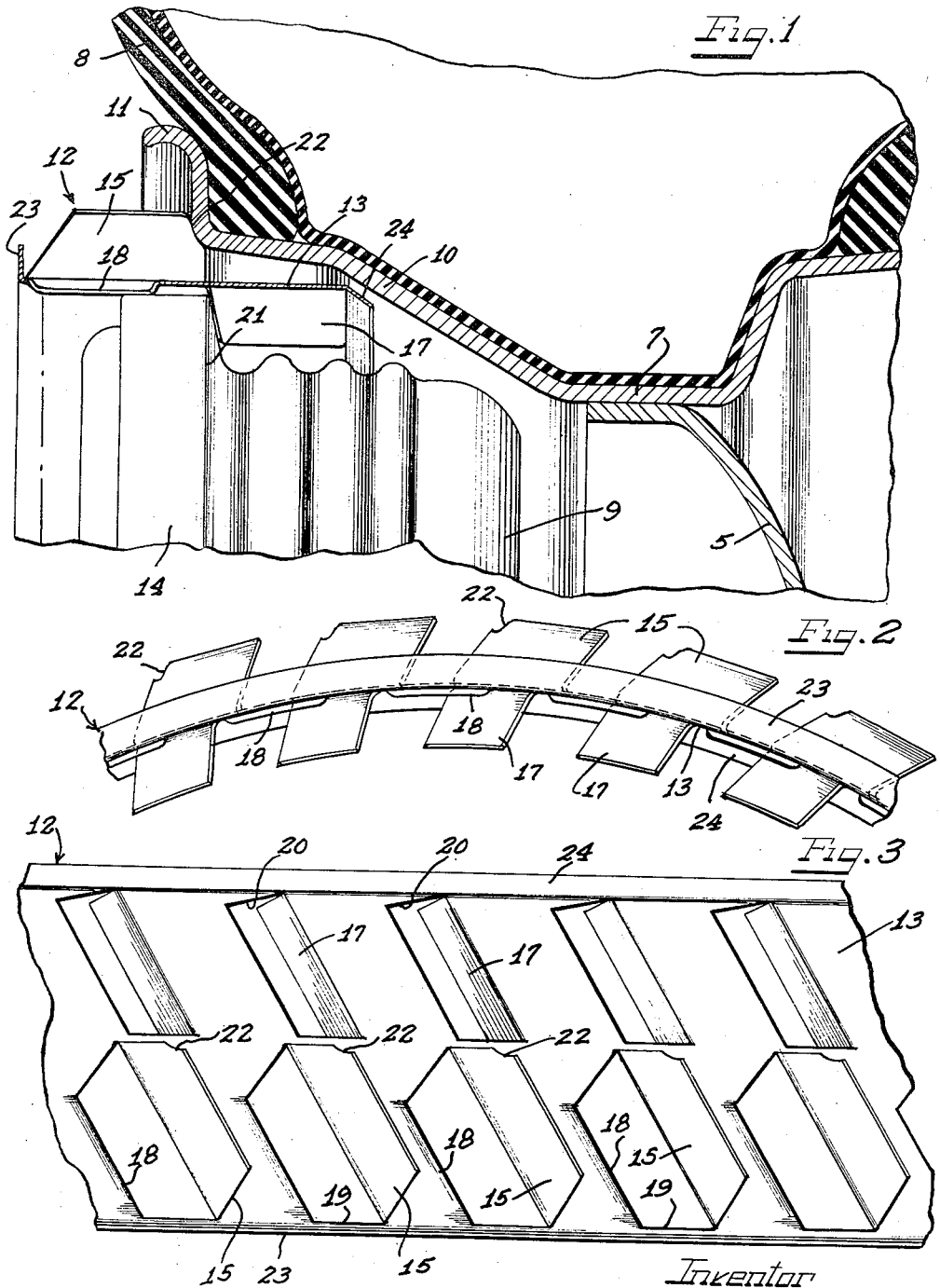

2,808,910

COMBINATION BRAKE DRUM COOLING AND VIBRATION DAMPING DEVICE

George Albert Lyon, Detroit, Mich.

Application September 3, 1954, Serial No. 454,147

13 Claims. (Cl. 188—264)

The present invention relates to improvements in devices for assisting in the cooling of automotive brake drums and also for damping vibrations that may develop in the brake drums and frequently audible as squealing when the brakes are applied in service.

An important object of the present invention is to provide a combination brake drum cooling and vibration damping device that may be constructed entirely from strip sheet metal.

Another object of the invention is to provide an improved combination brake drum cooling and vibration damping device that is low in initial cost and can be applied easily and quickly without requiring special tools.

A further object of the invention is to provide a brake drum cooling device having a plurality of sets of air motivating vanes.

Still another object of the invention is to provide a brake drum cooling device that has a plurality of cooperating air motivating structures thereon.

Yet another object of the invention is to provide a device that effectively damps vibrations in a brake drum by bridging the gap between the brake drum and the adjacent tire rim.

Other objects, features and advantages of the present invention will be readily apparent from the following detailed description of a preferred embodiment thereof taken in conjunction with the accompanying drawing, in which:

Figure 1 is a fragmentary radial sectional and elevational view through a wheel structure embodying features of the present invention;

Figure 2 is a fragmentary inside edge elevational view of the brake drum cooling and vibration-damping ring device of the present invention; and Figure 3 is a fragmentary developed plan view of the ring device.

The modern trend is toward larger tires and therefore larger tire rims. At the same time larger brake drums, or at least more powerful brake mechanisms are utilized in conjunction with the wheels to accommodate the higher speeds and greater weight factors that must be reckoned with in modern automobile styles. Inasmuch as the brake drums are substantially encircled by the tire rims and the space between the brake drums and the tire rims is rather narrow, stagnation of air and thereby overheating of the brakes is an ever present danger. A wheel of the kind under consideration is depicted in Figure 1 and comprises a wheel body 5 which may be of the disk spider type having its margin attached to a base flange 7 of a tire rim of the multi-flange, drop-center type adapted to support a pneumatic tire and tube assembly 8. The wheel body 5 is arranged to be secured in the customary manner as by bolts or the like (not shown) to an axle structure supporting a brake drum 9 inside of the wheel.

It will be observed that in this type of wheel, the tire rim has a generally axially inwardly and radially outwardly extending flange 10 projecting to a substantial extent from the base flange 7 in encircling relation to the brake drum 9 and merging with an inner terminal flange 11. The tire rim flanges 10 and 11, together with the inwardly bulging portion of the tire 8 substantially completely surround the brake drum 9 and thus tend to shield the brake drum from slip stream air moving past the wheel in service. Moreover, the space between the brake drum 9 and the tire rim is fairly limited so that centrifugal force motion of air about the brake drum is severely restricted.

According to the present invention a novel air circulation promoting device in the form of a ring member 12 is provided. This may comprise a stamped or rolled generally cylindrical sheet metal body 13 of a diameter to fit in assembly closely about an inner enlarged diameter portion 14 of the brake drum 9. Positive circulation of air into and through the gap between the brake drum and the tire rim, and more particularly the tire rim flange 10 and in cooling relation to the brake drum 9, is provided for by the provision on the ring member 13 of air impelling vane flanges 15 for moving the air from the inner side of the wheel toward the outer side into the brake drum gap, and a second series of cooperating vane wing flanges 17 functioning to impel the air effectively in cooling relation to the brake drum. In addition to their function as air impelling means, the vane flanges 15 and 17 serve herein also as means for maintaining the brake drum cooling ring 12 in axial position in the assembly, and as vibration damping means for dissipating audible frequency vibrations generated in the brake drum 14 during operation of the brakes.

As best seen on reference to Figure 3, the respective series of vane flanges 15 and 17 are disposed on respectively the axially inner and axially outer annular substantially half portions of the ring body 13. Although, as will be clear, the two sets of wing flanges might be separately formed and attached to the ring body 13, if desired, an economical, inexpensive manner of providing the wing flanges is to strike the same directly from the sheet metal ring body. Accordingly, the vane flanges 15 are struck out of the ring body and bent up toward the radially outer side of the body, and the vane flanges 17 are struck out of the ring body and bent to extend toward the radially inner side thereof.

For efficient axially outward movement of air by the vane flanges 15, they are preferably formed to extend diagonally relative to the axis of the ring, angled with their axially inner ends in the direction of rotary movement of the ring in operation. Furthermore, the vanes 15 are angled transversely in the direction of rotary movement as best visualized in Figures 2 and 3. Thereby the vane flanges 15, in effect, provide air scoops operable as the ring is turned in the direction of tilt or angling thereof to scoop air in a generally axially outward direction across the perimeter of the ring 13.

Additional means for moving air axially outwardly over the periphery of the ring 13, cooperatively related to the vanes 15, herein comprise generally radially inwardly and circumferentially angled air scoop ramps 18 provided along the elongated edges defining apertures 19 from which the vanes 15 have been struck and having the opposite longitudinal edges defined by the junctures of the vanes with the body of the ring. Thus as the ring 13 turns in the direction of angling of the vanes 15, the air scoop lips or ramps 18 projecting to the inside of the ring 13 scoop air up onto the radially outer side or surface of the ring 13 where the air is diverted by the next succeeding one of the vanes 15 toward the axially outer portion of the ring 13.

As the air motivated by the vanes flanges 15 moves therefrom across the axially outer portion of the ring 13, it is adapted to move through generally transversely elongated diagonally disposed apertures 20 in the ring 13 afforded by the striking out and bending inwardly of the vane flanges 17. It will be observed from Figures 2 and 3 that elongation of the vanes flanges 17 and the apertures 20 is in the same general diagonal direction across the ring body 13 as the elongation and diagonal disposition of the vanes 15 and the apertures 19 associated therewith. In addition, the apertures 20 are disposed generally in line with the solid areas between adjacent ones of the vanes 15 and the apertures 19 adjacent thereto in the direction of rotary movement of the ring. Thereby the air diverted or deflected generally axially outwardly by each of the vanes 15 moves more or less directly toward the adjacent end of one of the apertures 20 through which it may move to the inner side of the ring where the air is then further impelled generally radially inwardly by the several inwardly directed vanes 17. For this purpose the vanes 17 are angled similarly as the vanes 15, that is they are angled in the same general diagonal direction relative to the axis of the ring and are also angled transversely or peripherally away from the direction of rotation of the ring in service.

Assembly of the cooling ring 12 with the wheel is effected simply by concentrically assembling the ring onto the brake drum 9, and more particularly the enlarged diameter portion 15 of the brake drum before the wheel is mounted on the axle with which the brake drum is associated. A limit upon axially inward movement of the cooling ring on the brake drum is afforded by the axially inner ends of the several vanes 17 which are, for this purpose, engageable as stops against a generally axially outwardly facing shoulder 21 at juncture of the enlarged portion 14 of the brake drum with the smaller diameter portion of the brake drum. In this position of the cooling ring, the air scoop ramps 18 engage on their inner portions with the periphery defined by the brake drum portion 14, while a substantial annular axially inner marginal portion of the ring body 13 projects axially inwardly beyond the edge of the brake drum.

Axially outward displacement of the ring member 12 is prevented when the wheel is secured in place, by engagement of the axially outer end portions of the vanes 15 with the tire rim and more particularly the juncture shoulder area between the tire rim flange 10 and the inner terminal flange 11. For this purpose the rim-engaging edges of the vanes 15 are preferably notched out to provide seats 22 generally complementary to the tire rim shoulder engaged thereby.

The construction and relationship of the respective adjacent edges of the vanes 15 and 17 engageable with respectively the brake drum and the tire rim is preferably such that as the tire rim thrusts against the engaged edges of the vanes 15, tensioned resilient engagement thereof with the vanes 15 results and at the same time the brake drum engaging edges of the vanes 17 are thrust under resilient tension against the brake drum shoulder 21. This resilient tensioning interrelationship is enhanced by the diagonal, convergent relationship of the engaged edge portions of the vanes with the wheel surfaces engaged thereby. It might also be pointed out that since the edges of the vanes 17 that engage the brake drum shoulder 21 are angled in the forward rotation direction, the ring member 12 is held thereby effectively against turning in that direction relative to the wheel responsive to torque stresses such as when the brakes of the vehicle are applied, while at the same time the edges of the vanes 15 which engage the tire rim and are angled in the reverse or backward direction relative to the normal forward rotation of the wheel effectively frictionally or bitingly cooperate with the tire rim and prevent backward rotation of the cooling ring on the wheel.

Cooperatively related to the axially inner ends of the air motivating vane flanges 15 is an annular radially outwardly directed preferably continuous flange 23 providing a rigid inner marginal reinforcement for the ring body 13.

In addition the flange 23 cooperates with the vanes 15 in the air scooping action of the vanes by restraining axially inward escape of air from in front of the vanes 15 in the forward movement of the ring on the wheel.

Axially outward projection of the ring body 13 is proportioned to the available space within the gap between the tire rim and the brake drum to afford the most efficient extent of the vanes 17 permissible under the circumstances. In addition, the axially forward marginal extremity of the ring body 13 is preferably provided with an annular continuous reinforcing flange 24 which is angled generally axially outwardly and radially inwardly and serves as an air deflecting baffle in cooperation with the air motivating vanes 17 for assisting in directing the cooling air toward and into circulation about the brake drum 9.

It will be observed in Fig. 1 that the axially outer marginal flange 24 in assembly is in proximity to the tire rim flange 10 and that the ring body 13 generally converges toward the rim flange 10 so that the gap between the ring body 13 and the tire rim gradually diminishes from the inner side of the wheel toward the axially outer margin of the ring. As a result of this narrowing of the gap, diversion of air motivated axially outwardly into the gap by the vanes 15 through the air openings 20 is facilitated.

By virtue of the resilient tensioning of the air motivating vane flanges 15 and 17 with the wheel parts and the connection of the vane flanges to the ring body 13 and thereby to each other, the cooling ring member 12 is enabled to serve as a vibration damper to dissipate audible frequency vibrations in the brake drum. Not only do the individual vanes have vibrational frequency responses out of phase relative to the audible frequency responses of the brake drum, but the tire rim to which brake drum vibrations may be transferred through the connection afforded by the ring member 12 is effectively damped against any harmonic vibrational frequency responses by the pneumatic tire and tube assembly 8 or by the tire alone where it is a tubeless tire.

It will be understood that modifications and variations may be effected without departing from the scope of the novel concepts of the present invention.

I claim as my invention:

1. In a wheel structure including a tire rim and a brake drum affording a gap therebetween, an air cooling ring member having cooperative sets of annularly disposed air motivating vanes respectively engageable retainingly with the tire rim and the brake drum.

2. In a wheel structure including a tire rim and a brake drum affording a gap therebetween, an air cooling ring member having cooperative sets of annularly disposed air motivating vanes respectively engageable retainingly with the tire rim and the brake drum, said vanes being under resiliently tensioned engagement in assembly with the tire rim and brake drum.

3. In a wheel structure including a tire rim and a brake drum in gap relation, a cooling ring structure for effecting cooling air circulation with respect to the brake drum and including generally radially outwardly angled vanes for promoting air circulation into the gap and disposed in axially offset relation thereto, and generally radially inwardly angled vanes lying in air intercepting relation across said gap and facing generally circumferentially for driving such air into cooling relation to the brake drum.

4. In a wheel structure including a tire rim and a brake drum having an axially inner portion providing a generally axially outwardly facing annular shoulder, a cooling ring arranged to encircle the annular shoulder of the brake drum and having a portion extending axially inwardly therebeyond and provided with a series of vanes angled generally radially outwardly therefrom and arranged to retainingly oppose a generally axially inwardly directed portion of the tire rim, and a series of generally radially inwardly directed vanes lying across said gap and with the major surfaces facing generally circumferentially on a generally axially outer portion of the ring engageable retainingly with said brake drum shoulder and operable to motivate air directed thereto by the inner vanes against the brake drum.

5. In a cooling ring for association with a wheel having a tire rim and a brake drum in gap relation, a ring member having axially inner and outer annular portions, said annular portions having respectively oppositely directed and generally circumferentially facing air moving vanes.

6. In a cooling ring for association with a wheel having a tire rim and a brake drum in gap relation, a ring member having axially inner and outer annular portions, said annular portions having respectively oppositely directed air moving vanes, said vanes being struck out from said portions of the ring and facing generally circumferentially.

7. In a cooling ring for association with a wheel having a tire rim and a brake drum in gap relation, a ring member having axially inner and outer annular portions, said annular portions having respectively oppositely directed air moving vanes, said vanes being struck out from said portions of the ring and angled in a generally diagonal relation to the axis of the ring and in the circumferential direction of normal rotation of the ring in service.

8. In a brake drum cooling ring, a generally axially extending ring body having on one axially extending portion an annular series of generally radially outwardly projecting vanes and on the opposite axially extending portion an annular series of generally radially inwardly projecting vanes cooperable with the radially outwardly projecting vanes, and respective annular marginal flanges on the body directed angularly generally in the radial direction of projection of the adjacent vanes.

9. In a brake drum cooling ring structure, a ring body having a series of apertures in peripheral spaced relation, vanes at said apertures, said vanes being disposed along one side of the apertures, and air scoop ramps cooperatively related to the vanes and disposed along the opposite sides of the apertures and angled to divert air through said apertures toward the respective vanes of the circumferentially adjacent apertures.

10. In a brake drum and tire rim assembly, a ring structure interposed between the brake drum and tire rim and having a series of resilient vibration-damping tab-like flanges projecting therefrom into engagement with the brake drum and additional resilient vibration-damping tab-like flanges projecting into engagement with the tire rim.

11. In a brake drum and tire rim assembly providing an annular gap therebetween, a ring member engageable about the brake drum and having an axially inner marginal portion projecting beyond the brake drum and an axially outer marginal portion projecting into said gap in generally converging relation with the tire rim, means on said axially inner marginal portion for motivating air into the gap in the rotation of the wheel, and openings in said outer marginal portion for diversion of the air radially inwardly toward the brake drum and having air motivating means for impelling the air toward the brake drum.

12. In a brake drum and tire rim assembly providing an annular gap therebetween, a ring member engageable about the brake drum and having an axially inner marginal portion projecting beyond the brake drum and an axially outer marginal portion projecting into said gap in generally converging relation with the tire rim, means on said axially inner marginal portion for motivating air into the gap in the rotation of the wheel, and openings in said outer marginal portion for diversion of the air radially inwardly toward the brake drum and having air motivating means for impelling the air toward the brake drum, said outer marginal portion of the ring having an annular marginal extremity baffle flange directed generally radially inwardly and axially outwardly and cooperating with said air impelling means to direct the air toward the brake drum.

13. In a wheel structure including a brake drum, a brake drum cooling ring including a sheet metal annular ring body, said ring body having an annular spaced series of transversely elongated apertures therein with the material struck from the apertures bent up along one edge of the apertures to extend generally radially outwardly, and air scoop ramp formations directed generally radially inwardly along the opposite edges defining the apertures and frictionally engaging the brake drum.

References Cited in the file of this patent

UNITED STATES PATENTS

| | | |
|---|---|---|
| 2,053,735 | Overholser | Sept. 8, 1936 |
| 2,197,583 | Koeppen et al. | Apr. 16, 1940 |
| 2,265,938 | Eksergian | Dec. 9, 1941 |
| 2,659,460 | Lyon | Nov. 17, 1953 |
| 2,687,192 | Butterfield | Aug. 28, 1954 |

FOREIGN PATENTS

| | | |
|---|---|---|
| 7,862 | Australia | Oct. 25, 1927 |
| 572,202 | Great Britain | Sept. 27, 1945 |
| 787,597 | France | July 8, 1935 |